(12) United States Patent
Kemnitz et al.

(10) Patent No.: US 9,726,223 B2
(45) Date of Patent: Aug. 8, 2017

(54) METHOD FOR THE PRODUCTION OF A CONNECTING ROD FOR AN INTERNAL COMBUSTION ENGINE

(71) Applicant: MAHLE International GmbH, Stuttgart (DE)

(72) Inventors: Peter Kemnitz, Leutenbach (DE); Klaus Keller, Lorch (DE)

(73) Assignee: MAHLE International GmbH, Stuttgart (DE)

( * ) Notice: Subject to any disclaimer, the term of this patent is extended or adjusted under 35 U.S.C. 154(b) by 209 days.

(21) Appl. No.: 14/250,463

(22) Filed: Apr. 11, 2014

(65) Prior Publication Data
US 2014/0242277 A1 Aug. 28, 2014

Related U.S. Application Data

(62) Division of application No. 12/086,738, filed as application No. PCT/DE2006/002258 on Dec. 15, 2006, now abandoned.

(30) Foreign Application Priority Data

Dec. 21, 2005 (DE) .......... 10 2005 061 062
Mar. 23, 2006 (DE) .......... 10 2006 013 399

(51) Int. Cl.
  *F16C 33/10* (2006.01)
  *F16C 33/20* (2006.01)
  (Continued)

(52) U.S. Cl.
  CPC ............ *F16C 33/1045* (2013.01); *B05D 1/40* (2013.01); *B05D 3/0218* (2013.01);
  (Continued)

(58) Field of Classification Search
  CPC ......... Y10T 29/49288; Y10T 29/49982; Y10T 29/49986; F16J 7/00; B23P 2700/04;
  (Continued)

(56) References Cited

U.S. PATENT DOCUMENTS 1,936,101 A * 11/1933 Baits .................. F16C 9/04
                                                   184/11.4
2,851,316 A    9/1958 Thomson
(Continued)

FOREIGN PATENT DOCUMENTS

DE    41 11 368 A1    1/1992
DE    102 08 118 A1   10/2002
(Continued)

OTHER PUBLICATIONS

International Search Report of PCT/DE2006/002258, mailed Apr. 17, 2007.

*Primary Examiner* — David Bryant
*Assistant Examiner* — Lawrence Averick
(74) *Attorney, Agent, or Firm* — Collard & Roe, P.C.

(57) ABSTRACT

A method for producing a connecting rod for an internal combustion engine, having a small connecting rod eye for holding a piston pin and having a large connecting rod eye for holding a crank pin, wherein at least one connecting rod eye has at least one geometric deviation from a cylindrical inner contour. It is provided according to the invention that the at least one connecting rod eye is formed by creating a bore with a cylindrical inner contour, and coating the bore with a coating comprising a resin with solid lubricant particles embedded therein. The coating forms the at least one geometric deviation from the cylindrical inner contour of the at least one connecting rod eye.

8 Claims, 3 Drawing Sheets

(51) Int. Cl.

| | | |
|---|---|---|
| *F16J 7/00* | (2006.01) | |
| *F16C 7/00* | (2006.01) | |
| *F16C 9/04* | (2006.01) | |
| *B05D 1/40* | (2006.01) | |
| *B05D 3/02* | (2006.01) | |
| *B05D 5/08* | (2006.01) | |
| *B05D 7/22* | (2006.01) | |
| *F16C 7/02* | (2006.01) | |

(52) U.S. Cl.
CPC ............ *B05D 3/0254* (2013.01); *B05D 5/08* (2013.01); *B05D 7/22* (2013.01); *F16C 7/00* (2013.01); *F16C 9/04* (2013.01); *F16C 33/1065* (2013.01); *F16C 33/208* (2013.01); *F16J 7/00* (2013.01); *F16C 7/023* (2013.01); *F16C 33/103* (2013.01); *F16C 33/201* (2013.01); *F16C 2223/42* (2013.01); *F16C 2360/22* (2013.01); *Y10T 29/49288* (2015.01); *Y10T 74/2162* (2015.01)

(58) Field of Classification Search
CPC ...... B05D 1/02; B05D 3/0218; B05D 3/0254; B05D 5/08; B05D 5/083; B05D 7/14; B05D 7/22; B05D 2202/00; B05D 2254/04; B05D 2505/00
USPC ............................... 123/197.3; 427/236, 239
See application file for complete search history.

(56) References Cited

U.S. PATENT DOCUMENTS

| | | |
|---|---|---|
| 3,582,166 A | 6/1971 | Reising |
| 3,641,990 A | 2/1972 | Kinnersly |
| 3,909,087 A | 9/1975 | Cairns |
| 4,105,267 A | 8/1978 | Mori |
| 4,156,049 A | 5/1979 | Hodes et al. |
| 4,541,304 A | 9/1985 | Chikugo et al. |
| 4,546,669 A | 10/1985 | Fischer et al. |
| 4,567,815 A | 2/1986 | Kocher |
| 4,658,500 A | 4/1987 | Engel et al. |
| 4,847,135 A | 7/1989 | Braus et al. |
| 5,373,637 A | 12/1994 | Harris et al. |
| 5,447,774 A | 9/1995 | Tanaka et al. |
| 5,525,246 A | 6/1996 | Kamiya et al. |
| 5,700,093 A | 12/1997 | Hiramatsu et al. |
| 5,746,169 A | 5/1998 | Issler et al. |
| 5,788,380 A | 8/1998 | Niegel et al. |
| 6,095,690 A | 8/2000 | Niegel et al. |
| 6,273,612 B1* | 8/2001 | Ono ......................... F16C 9/04 384/276 |
| 6,367,151 B1 | 4/2002 | Schlegel et al. |
| 6,379,754 B1* | 4/2002 | Schlegel ................... C08B 3/10 427/434.2 |
| 6,513,238 B1 | 2/2003 | Schlegel |
| 6,560,869 B1* | 5/2003 | Schlegel ................. F16C 7/023 29/413 |
| 6,648,513 B2 | 11/2003 | Okamoto et al. |
| 6,921,205 B2 | 7/2005 | Kanayama et al. |
| 7,178,238 B2 | 2/2007 | Rumpf et al. |
| 7,743,746 B2 | 6/2010 | Maier et al. |
| 8,234,785 B2* | 8/2012 | Guerreiro ............... B23P 15/00 29/888.09 |
| 2003/0235355 A1 | 12/2003 | Hiramatsu et al. |
| 2004/0064949 A1* | 4/2004 | Rumpf ..................... C23C 2/00 29/898.12 |
| 2004/0064951 A1 | 4/2004 | Ederer et al. |
| 2005/0238829 A1* | 10/2005 | Motherwell .......... B05B 7/0416 428/34.1 |
| 2006/0070238 A1 | 4/2006 | Gomyo et al. |
| 2006/0083451 A1* | 4/2006 | Kawagoe ............... F16C 33/201 384/276 |
| 2006/0141242 A1* | 6/2006 | Keener .................... B05D 7/16 428/334 |
| 2010/0050432 A1* | 3/2010 | Guerreiro ............... B23P 15/00 29/888.09 |

FOREIGN PATENT DOCUMENTS

| | | |
|---|---|---|
| DE | 103 44 723 A1 | 8/2004 |
| DE | 10 2004 059 490.2 | 12/2004 |
| DE | 10 2005 055 366 A1 | 6/2006 |
| EP | 0 095 052 A2 | 11/1983 |
| FR | 2 214 063 A1 | 8/1974 |
| GB | 2 238 492 A | 6/1991 |
| GB | 2 338 995 A | 1/2000 |
| WO | 96/07841 A1 | 3/1996 |
| WO | 2006/061012 A2 | 6/2006 |

\* cited by examiner

METHOD FOR THE PRODUCTION OF A CONNECTING ROD FOR AN INTERNAL COMBUSTION ENGINE

CROSS-REFERENCE TO RELATED APPLICATIONS

This is a divisional of U.S. patent application Ser. No. 12/086,738, filed on Jun. 18, 2008, which is the National Stage of PCT/DE2006/002258 filed on Dec. 15, 2006, which claims priority under 35 U.S.C. §119 of German Application No. 10 2005 061 062.5 filed on Dec. 21, 2005 and German Application No. 10 2006 013 399.4 filed Mar. 23, 2006. The international application under PCT article 21(2) was not published in English.

BACKGROUND OF THE INVENTION

The present invention relates to a connecting rod for an internal combustion engine, having a small connecting rod eye for accommodating a piston pin, and a large connecting rod eye for accommodating a crank journal, whereby at least one connecting rod eye has at least one geometric deviation from a cylindrical inside contour. The present invention furthermore relates to a method for the production of such a connecting rod.

The connecting rod connects the piston of an internal combustion engine with the crankshaft. In this connection, the small connecting rod eye accommodates the piston pin, while the large connecting rod eye surrounds a crank journal. The small and the large connecting rod eye are provided with slide bearing surfaces, for example in the form of slide bearing layers. The slide bearing surfaces of these components are subject to very great mechanical stress. In particular, the piston pin can bend as a result of the tremendous forces that act on the piston during the oscillating movement of the piston. As a result, the connecting pin eyes are subject to great stress. Therefore, ways are being sought to relieve stress on the connecting rod eyes. This is done, for example, by means of local geometric changes in the usually cylindrical connecting rod eye, which reduce the mechanical stress. Such geometric changes can be, for example, stress relief pockets, oval, conical or spherical bores. This principle is already known for pin boss bores, see, for example, WO 96/07841 A1. Such geometric changes have been produced by means of complicated precision machining of the connecting rod eyes until now.

Connecting rods having connecting rod eyes with slide bearing surfaces are known from the German patent application 10 2004 059 490.2. The slide bearing surfaces are coated with a self-lubricating coating made of a resin with solid lubricant particles embedded in it.

SUMMARY OF THE INVENTION

It is the task of the present invention to make available a connecting rod in which at least one connecting rod eye can be provided with local geometric deviations in particularly simple manner.

The solution consists in a connecting rod and a method for producing the connecting rod in which at least one connecting rod eye is formed from a bore having a cylindrical inside contour, that the bore is provided with a coating comprising a resin with solid lubricant particles embedded in it, and that the coating forms the at least one geometric deviation from the cylindrical inside contour of the connecting rod eye. The method according to the invention is characterized in that first, a bore having a cylindrical inside contour is produced, and subsequently, a coating agent comprising a resin with solid lubricant particles embedded in it is applied to the inside surface of this bore, by means of a coating tool, so that the resulting coating forms the at least one geometric deviation from the cylindrical inside contour of the at least one connecting rod eye.

With the present invention, it is possible to produce connecting rod eyes having at least one geometric deviation from the cylindrical inside contour, and having a self-lubricating coating of their inside surfaces, in one and the same work step. This means a significant saving in time and costs. The complicated and very complex cutting machining of the metallic inside surfaces of the connecting rod eyes for the purpose of introducing the at least one geometric deviation is eliminated. Furthermore, bearing bushings or bearing shells are no longer necessary to achieve sufficient lubrication and an anti-seizure effect of the connecting rod eyes. Coating can take place without prior application of an adhesion layer. The desired dimensional accuracy of the coating rod eyes is reliably achieved. The strength and therefore the useful lifetime of the bearing of piston pin and/or crank journal are significantly improved, as a result of the improved lubrication properties as compared with the previously known coatings made of metal alloys.

The at least one geometric deviation can be configured as at least one stress-relief pocket and/or ovality (for example as a heightwise or crosswise ovality) and/or as a shaped bore, as it is disclosed in WO 96/07841 A1 for pin bores, for example.

In advantageous manner, at least one oil collection chamber can be provided in the coating, in order to further improve the lubrication of the bearing. The at least one oil collection chamber can be configured as a channel that runs in the direction of the longitudinal axis, as a channel that runs radially with regard to the longitudinal axis, surrounding it entirely or in part, and/or as a pocket-shaped recess.

The minimum thickness of the coating depends on the requirements of the individual case and can amount to 5 µm to 15 µm, for example.

Preferably, the resin contained in the coating is a thermally cured resin, particularly a polyamide resin, which is very temperature-resistant and can withstand the stresses that the bearing is subject to in operation particularly well.

It has been shown that a proportion of 50 wt.-% to 60 wt.-% of solid lubricant particles in the coating has particularly good lubrication properties. In this connection, the solid lubricant particles can particularly consist of a material that is selected from the materials group that comprises graphite, molybdenum sulfide, tungsten disulfide, hexagonal boron nitride, and PTFE (polytetrafluoroethylene). In this connection, it is advantageous if the solid lubricant particles consist of only one material. In this connection, it is particularly advantageous if all the solid lubricant particles consist of the same material, or if solid lubricant particles that consist of two different materials are mixed, for example solid lubricant particles of graphite with solid lubricant particles of a metal sulfide. For particularly effective lubrication, the solid lubricant particles have a particle size of 1 µm to 3 µm.

In the case of the method according to the invention, the at least one geometric deviation can be configured by means of varying the amount of the coating agent given off by the coating tool and/or by means of varying the advance of the coating tool in the bore to be coated.

A possible alternative, of course, consists in applying the coating agent in a uniform thickness and configuring the at least one geometric deviation by means of subsequent working of the resulting coating. Of course, this is significantly more complicated than making the at least one geometric deviation directly during the coating process. However, the result, namely a connecting rod having connecting rod eyes whose coating forms the at least one geometric deviation from the cylindrical inside contour of the connecting rod eyes, is the same.

It is advantageous if the coating agent is applied to inside surfaces of the bores with a surface roughness of Ra (average roughness value) ≤0.8 μm, in order to achieve particularly good adhesion. In order to further improve the adhesion of the coating agent to the inside surface of the bore, the inside surfaces of the bores can be pre-heated before and/or during application of the coating agent, preferably up to a temperature of 50° C. to 80° C.

The coating agent can be applied by means of rotation atomization from a rotating nozzle introduced into the bore, for example. In this connection, it has proven to be particularly practical to carry the rotation atomization out at a rotation speed of the nozzle of 14,000 to 18,000 rotations per minute.

A preferred further development of the method according to the invention consists in using a thermally curing coating agent and subjecting same to heat treatment immediately after completing the application, preferably at a temperature of 200° C.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
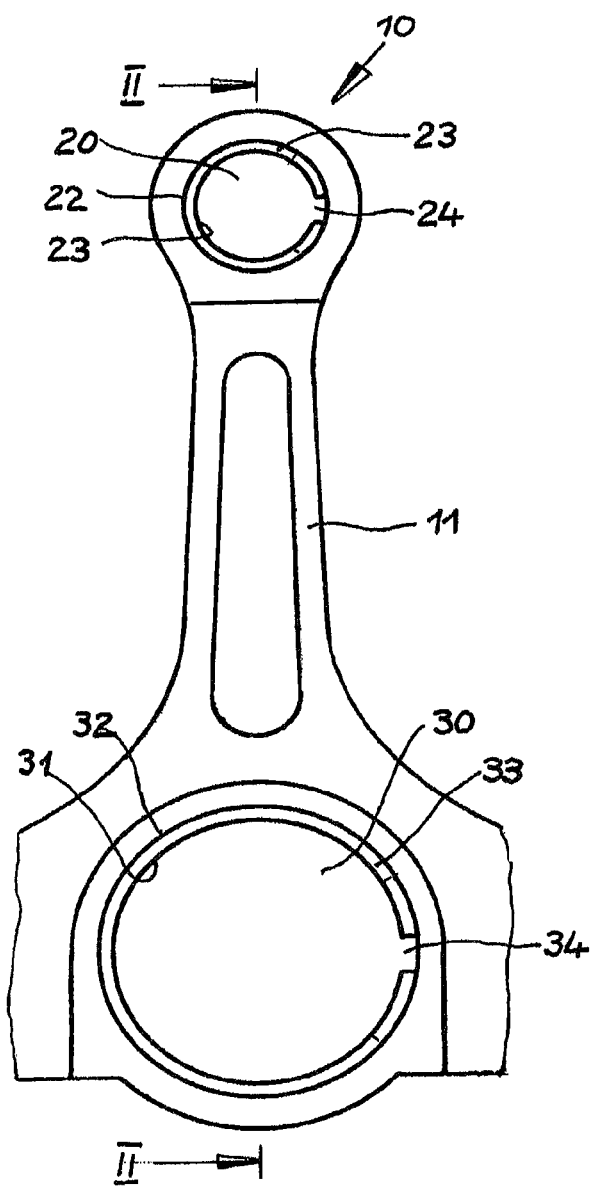
FIG. 1 is a front view of an embodiment of a connecting rod according to the invention.
Figure 2:
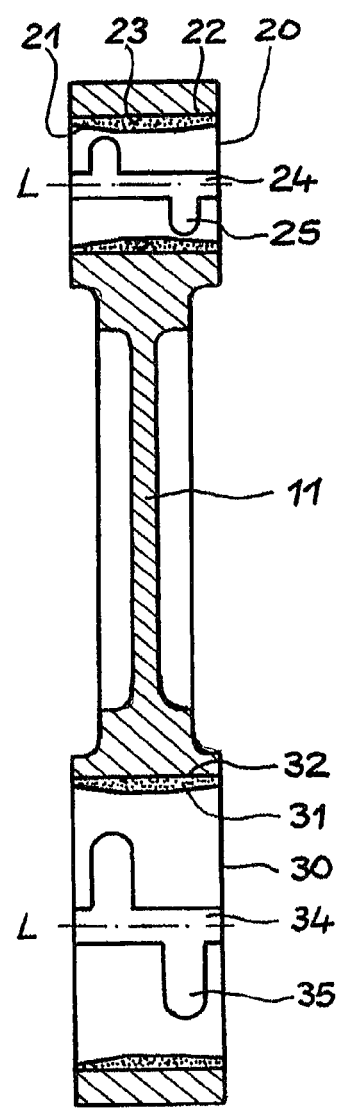
FIG. 2 is a section along the line II-II in FIG. 1.
Figure 3:
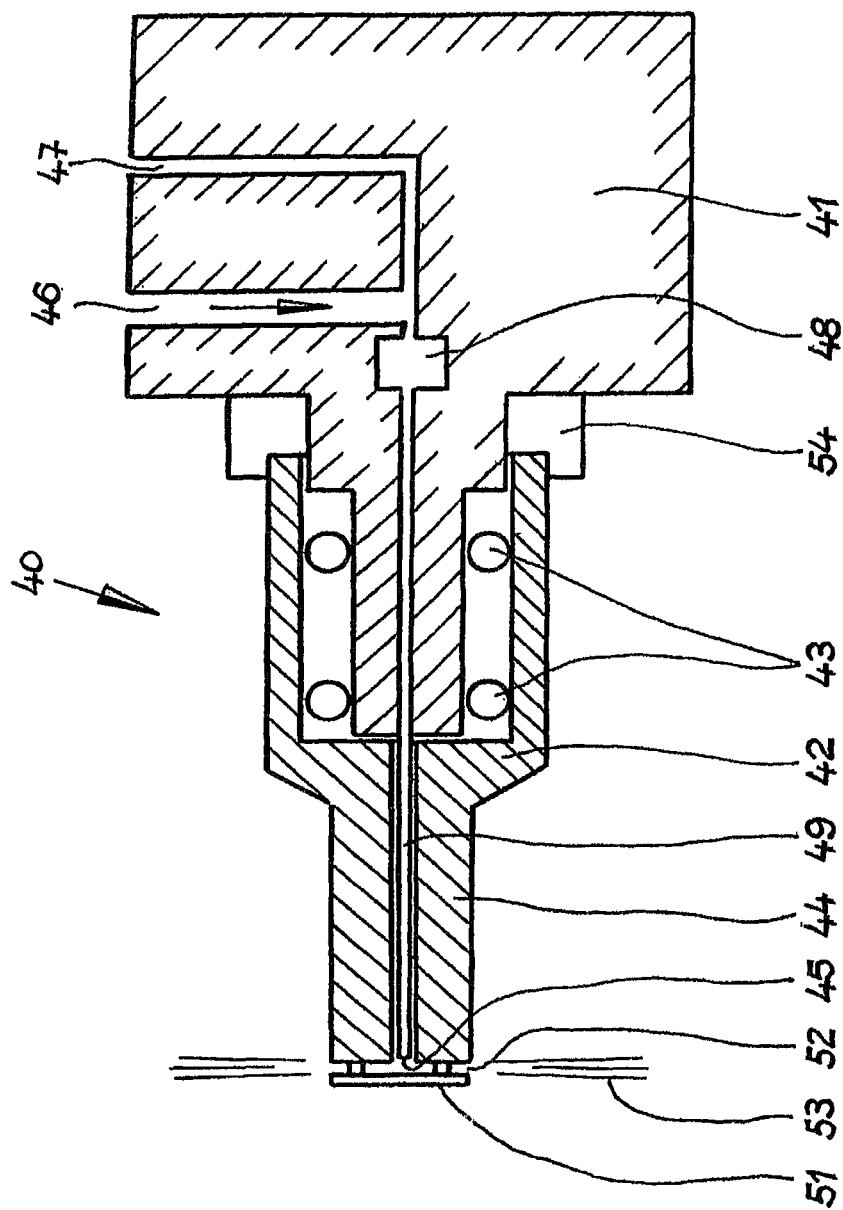
FIG. 3 is a schematic representation of a coating tool.

FIGS. 1 and 2 show an exemplary embodiment of a connecting rod 10 according to the invention. The connecting rod 10 consists, in known manner, of steel, for example. The connecting rod 10 has a connecting rod shaft 11, a small connecting rod eye 20, and a large connecting rod eye 30. The small connecting rod eye 20 accommodates the piston pin of a piston (not shown), while the large connecting rod eye 30 accommodates a crank journal of a crankshaft (not shown).

In the exemplary embodiment, the connecting rod eyes 20, 30 are shaped bores having a defined inside contour 21, 31 that deviates from the cylinder shape, as it is disclosed, for example, in WO 96/07841 A1. This configuration serves to relieve stress on the mechanical system of piston pin, connecting rod 10, and crank journal, during operation, in order to avoid the risk of cracks around the connecting rod eyes 20, 30. Other configurations of a connecting rod eyes that serve the same purpose are, for example, bores provided with ovality (heightwise and/or crosswise) or with stress relief pockets (not shown). These configurations are already known for pin bores.

In the exemplary embodiment, the two connecting rod eyes 20, 30 are configured, according to the invention, in such a manner that they are composed of a cylindrical bore 22 and 32, respectively, and a coating 23 and 33, respectively. In this connection, the surface contour of the coating 23 or 33 is structured in such a manner that the desired inside contour 21 and 31, respectively, of the connecting rod eye 20 and 30, respectively, which deviates from the cylinder shape, is obtained. In comparable manner, ovality or a stress relief pocket can also be formed by the surface structure of the coating 23 or 33 (not shown). The coating 23 or 33 essentially consists of a resin with solid lubricant particles embedded in it, and is thus a self-lubricating coating.

Figure 4:
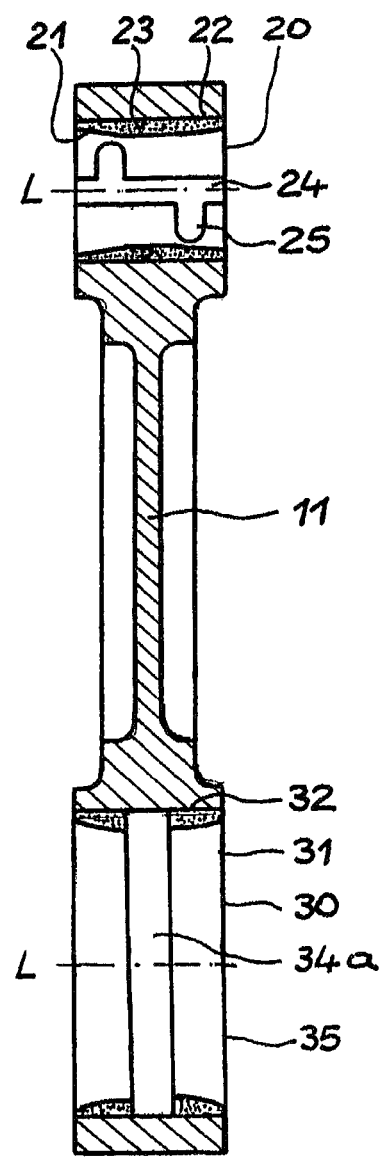
FIG. 4 is a section showing an alternative embodiment of the invention with the oil collection chamber in the form of a channel.

In the exemplary embodiment, the coating 23 or 33 is furthermore provided with oil collection chambers in the form of a channel 24 or 34 that extends in the direction of the longitudinal axis L of the connecting rod eye 20 or 30, in each instance, from which channel pockets 25 and 35, respectively, extend radially. These oil collection chambers serve to further improve the lubrication of the bearing of piston pin or crank journal, respectively, in each instance. Of course, they can be configured for any desired application, in any desired shape and size, and can be disposed relative to one another in any desired form. For example, FIG. 4 shows the oil collection chamber in the form of a channel 34a which runs radially relative to the direction of the axis L and surrounds axis L at least in part.

To produce a connecting rod eye 20, 30, first the cylindrical bore 22 or 32 is made in the connecting rod shaft 11, and mechanically finished in known manner. The surface roughness Ra (average roughness value) can correspond to the one indicated in DE 41 11 368 A1, whereby in general, the Ra values amount to 0.63 μm or less for bore diameters of less than 30 mm, and Ra values of 0.8 μm or less are achieved for bore diameters between 30 mm and 60 mm. In the exemplary embodiment, the bore diameter is selected, before coating, in such a manner that the piston pin or the crank journal, respectively, has a diametral play of 10 μm to 40 μm in the finished connecting rod eye 20 or 30, respectively. The cylindrical bore 22 or 32 should be cleaned in such a manner that chips, other particles, machining oils and the like are completely removed. The inside surface of the cylindrical bore 22 or 32 can also be phosphatized.

If additional oil collection chambers, for example in the form of channels 24, 34 or pockets 25, 35, are supposed to be provided, corresponding cover templates are affixed in the cylindrical bore 22 or 32 before coating takes place, in known manner. The cover templates prevent coating of the covered regions of the cylindrical bore 22 or 32. As an alternative, the finished coating 23 or 33 can subsequently be worked, and can be provided with oil collection chambers in this way.

The coating agent selected in the exemplary embodiment is formed from a thermally curable resin with solid lubricant particles of one or more of the materials graphite, molybdenum sulfide, tungsten disulfide, hexagonal boron nitride, and PTFE embedded in it. In the exemplary embodiment, the resin is a very temperature-resistant polyamide imide, and the solid lubricant is a mixture of molybdenum sulfide and graphite particles having a particle size of 1 μm to 3 μm. In the exemplary embodiment, the amount of the solid lubricant is selected in such a manner that the finished coating contains about 50 to 60 wt.-% solid lubricant particles. The viscosity of the coating agent is adjusted in such a manner that droplet formation is prevented in the case of sufficient application.

A device 40 for rotation atomization serves to apply the coating to the inside surface of the cylindrical bore 22 or 32, in the exemplary embodiment. The device 40 has a base body 41 that is connected with a nozzle body 42. The nozzle body 42 is mounted to rotate on the base body, by means of a bearing 43. The nozzle body 42 has a nozzle 44 having an exit opening 45. The base body 41 possesses feed channels 46, 47, in each instance, which are intended for the liquid coating material and for compressed air, and end in a mixing chamber 48 for mixing and metering. An exit channel 49 extends from the mixing chamber 48, through the nozzle body 42, and opens into the exit opening 45. A baffle plate 51 is disposed perpendicular to the exit opening 45, so that a ring-shaped gap 52 having a width of 0.5 mm in the exemplary embodiment is formed between the baffle plate 51 and the nozzle body 42. The coating agent/air mixture exits through the gap 52, in the form of a spray jet 53, radially and at a distance from the nozzle body 42.

The nozzle body 42 is put into rotation by means of a drive 54, and rotates in the speed of rotation range from 14,000 to 18,000 rotations per minute in the exemplary embodiment. The coating agent/air mixture that exits from the exit opening 45 is accelerated by the centripetal forces that occur at the exit opening 45, in such a manner that it exits radially as a disk-shaped spray jet 53. Since the spray jet 53 is configured narrow in the direction of the longitudinal axis L, the inside surface of the cylindrical bore 22 or 32 that is to be coated can be sharply delimited, in the direction of the longitudinal axis L, by means of simple feed control of the coating agent/air mixture. In the exemplary embodiment, nozzles 44 having a diameter in the range between 5 and 25 mm and having depths up to 50 mm are available, so that it is possible to coat cylindrical bores 22, 32 for connecting rods of all engine types with the device 40. The diameter of the nozzle 44 is generally selected in such a manner that it approximately corresponds to half the diameter of the cylindrical bore 22 or 32.

A centrifuge device S-520 from Sprimag in Kirchheim is also suitable for carrying out the coating method.

In the exemplary embodiment, application of the coating agent/air mixture takes place onto the inside surface of the cylindrical bore 22 and/or 32, which has been pre-heated to 50° C. to 80° C. The nozzle 44 is introduced centrally into the cylindrical bore 22 or 32, from the outside to the inside. To configure the geometric deviation from the cylindrical inside contour, for example of the shaped bore shown in FIG. 2, the advance of the nozzle 44 is varied in a range of 10 to 20 mm/s, for example. In addition or as an alternative, the amount of the coating agent/air mixture exiting from the exit opening 45 of the nozzle 44 can be varied. For this purpose, it is practical that the device 40 works with computer control. When the nozzle 44 has reached the end of the cylindrical bore 22 or 32, the device 40 is turned off and retracted.

If cover templates are provided in the cylindrical bore 22 or 32 to produce oil collection chambers, the feed of the coating agent/air mixture is shut off when such a template is reached, so that residues of the spray jet are sprayed onto the cover template. When the end of the cover template has been reached, the feed of the coating agent/air mixture is achieved again.

When the coating agent has been applied, it is thermally hardened, in that the connecting rod, i.e. the connecting rod component that has the coated connecting rod eyes 20 and/or 30, is placed in an oven and held at a temperature of 200° C. between 10 and 20 minutes there, in the exemplary embodiment.

The finished coating 23 or 33 is approximately 5 μm to 20 μm thick at its thinnest point, and the diametral pin play of the piston pin or crank journal amounts to about 10 μm to 20 μm. This close play is particularly advantageous for avoiding noise development. The coating 23 or 33 furthermore guarantees that despite the close play, no seizing occurs.

Accordingly, while only a few embodiments of the present invention have been shown and described, it is obvious that many changes and modifications may be made thereunto without departing from the spirit and scope of the invention.

What is claimed is:

1. A method for the production of a connecting rod for an internal combustion engine, having a small connecting rod eye for accommodating a piston pin, and a large connecting rod eye for accommodating a crank journal, wherein at least one of the connecting rod eyes has at least one geometric deviation from a cylindrical inside contour, the method comprising the following steps:
   producing a bore having a cylindrical inside contour, and subsequently
   applying a coating agent comprising a resin with solid lubricant particles embedded in it to an inside surface of the bore, with a coating tool, so that the resulting coating forms the at least one geometric deviation from the cylindrical inside contour of the at least one connecting rod eye, wherein the at least one geometric deviation is formed by a stress relief pocket, an ovality or a shaped bore; and
   subsequently working at least one oil collection chamber into the resulting coating on the inside contour of the at least one connecting rod eye, the oil collection chamber being in the form of a channel extending in a direction of a longitudinal axis of the connecting rod eye across an entire width of the connecting rod eye, wherein the channel has two pockets extending circumferentially in opposite directions from each other and being offset from each other along the channel.

2. The method according to claim 1, wherein the at least one geometric deviation is configured by varying the amount of the coating agent given off by the coating tool and/or by varying an advance of the coating tool.

3. The method according to claim 1, wherein the coating agent is applied to the inside surface of the bore with a surface roughness of Ra (average roughness value) ≤0.8 μm.

4. The method according to claim 1, wherein the coating agent is applied by rotation atomization from a rotating nozzle introduced into the bore.

5. The method according to claim 4, wherein the rotation atomization is carried out at a rotation speed of the nozzle of 14,000 to 18,000 rotations per minute.

6. The method according to claim 1, wherein the inside surface of the bore is pre-heated before and/or during application of the coating agent, up to a temperature of 50° C. to 80° C.

7. The method according to claim 1, wherein a thermally curing coating agent is used in the step of applying, and further comprising the step of subjecting the coating to heat treatment immediately after the step of applying.

8. The method according to claim 7, wherein the heat treatment takes place at a temperature of about 200° C.

* * * * *